(12) United States Patent
Kikuchi et al.

(10) Patent No.: US 7,852,577 B2
(45) Date of Patent: Dec. 14, 2010

(54) METHOD OF MANUFACTURING A LENS BARREL ASSEMBLY

(75) Inventors: Kimihiro Kikuchi, Miyagi-ken (JP); Shigeru Hatakeyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/169,192

(22) Filed: Jul. 8, 2008

(65) Prior Publication Data
US 2009/0086341 A1    Apr. 2, 2009

(30) Foreign Application Priority Data
Sep. 28, 2007    (JP) ............... 2007-253012

(51) Int. Cl.
*G02B 7/02* (2006.01)
(52) U.S. Cl. .................... 359/819; 359/811
(58) Field of Classification Search ............ 359/811, 359/819
See application file for complete search history.

(56) References Cited

U.S. PATENT DOCUMENTS

| | | | |
|---|---|---|---|
| 5,333,224 A * | 7/1994 | Kikuchi | 385/93 |
| 7,304,684 B2 * | 12/2007 | Segawa et al. | 348/374 |
| 7,372,647 B2 * | 5/2008 | Pfnuer et al. | 359/819 |
| 2003/0147154 A1 * | 8/2003 | Shimizu et al. | 359/819 |
| 2004/0174618 A1 * | 9/2004 | Kikuchi | 359/811 |
| 2004/0184164 A1 * | 9/2004 | Kikuchi | 359/819 |
| 2004/0187522 A1 | 9/2004 | Kikuchi | |
| 2005/0162758 A1 * | 7/2005 | Tanaka | 359/811 |
| 2006/0114579 A1 * | 6/2006 | Shibuya et al. | 359/811 |

FOREIGN PATENT DOCUMENTS

JP    2878372    1/1999

* cited by examiner

*Primary Examiner*—Jessica T Stultz
*Assistant Examiner*—Mahidere S Sahle
(74) *Attorney, Agent, or Firm*—Brinks Hofer Gilson & Lione

(57) ABSTRACT

A method of manufacturing a lens barrel assembly includes forming a lens barrel by deep drawing into a cylindrical shape, forming a lens-retaining portion that retains a lens at one of two open sides of the lens barrel, and forming a component-receiving portion that receives an electric component at the other open side of the lens barrel. The lens-retaining portion has an outer diameter that is smaller than an outer diameter of the component-receiving portion and a wall thickness that is larger than a wall thickness of the component-receiving portion.

4 Claims, 1 Drawing Sheet

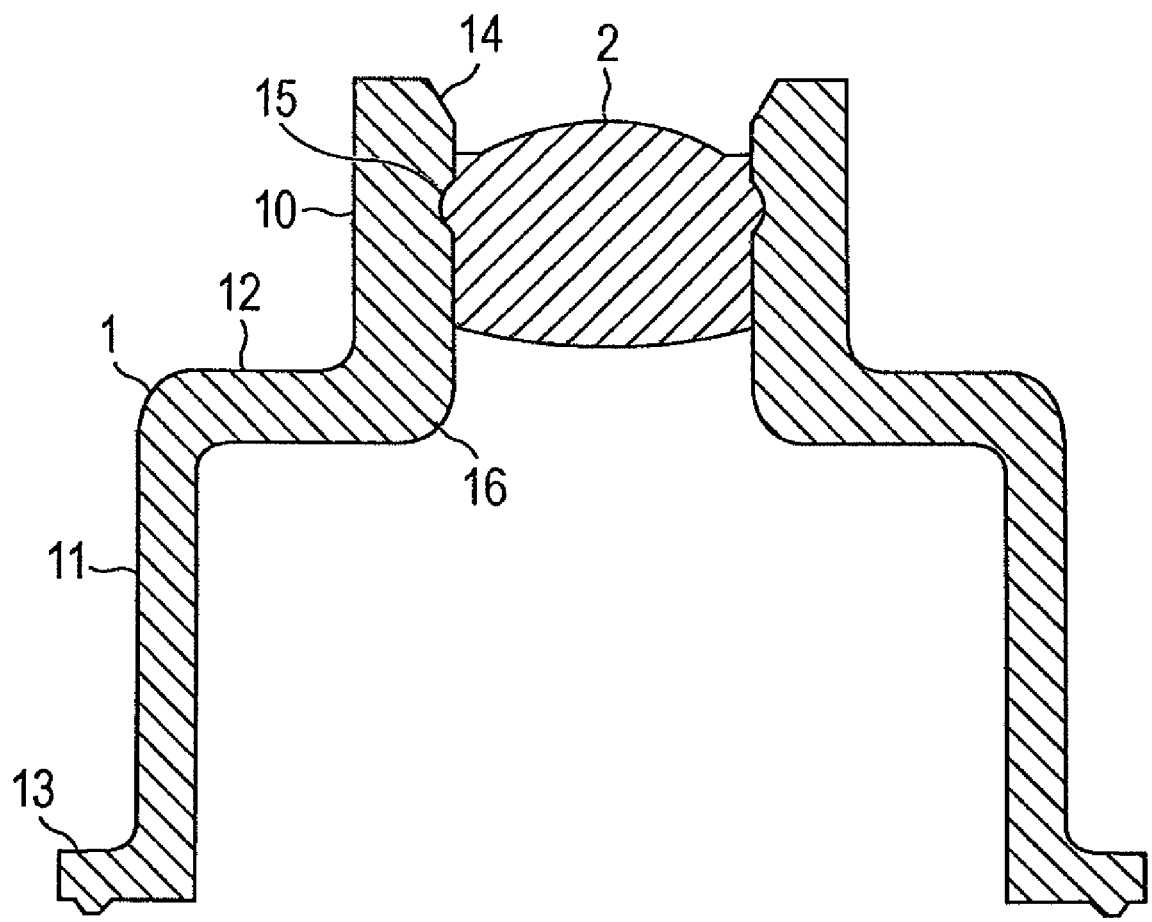
FIGURE

METHOD OF MANUFACTURING A LENS BARREL ASSEMBLY

CLAIM OF PRIORITY

This application claims benefit of the Japanese Patent Application No. 2007-253012 filed on Sep. 28, 2007, the entire contents which are hereby incorporated by reference.

BACKGROUND OF THE INVENTION

1. Field of the Invention

The present invention relates to lens barrel assemblies including lens barrels and lenses retained by the lens barrels, and more particularly, to a lens barrel assembly that can be manufactured at a low cost by forming a lens barrel by deep drawing.

2. Description of the Related Art

Lens barrel assemblies including cylindrical lens barrels and lenses retained by the lens barrels are known. An example of such a lens barrel assembly includes a lens barrel that is attached to a substrate such that the lens barrel covers an electric component, such as a semiconductor laser, provided on the substrate. The lens barrel assembly is used in an optical communication device to provide a function of, for example, emitting collimated light toward an isolator or collecting a laser beam at an end face of an optical fiber. The lens barrel included in the lens barrel assembly has a lens-retaining portion for retaining the lens at one of two open sides, and a component-receiving portion for receiving the electric component at the other open side. The lens-retaining portion and the component-receiving portion are formed integrally with each other. Japanese Patent No. 2878372 discloses an example of such a lens barrel assembly.

In commercialized lens barrel assemblies, the lens barrel is generally formed by a cutting process and the lens is formed in the lens barrel by a pressing process. In the case of forming the lens barrel by deep drawing a metal sheet, the lens-retaining portion and the component-receiving portion are formed to have substantially the same thickness, as described in Japanese Patent No. 2878372.

The outer diameter of the component-receiving portion is determined in conjunction with the diameter of a projection used in airtight welding and fixing. Therefore, it is difficult to change the outer diameter of the component-receiving portion. In addition, to ensure flexibility allowance for conductive wires connected to the electric component and work efficiency in the process of attaching the lens barrel, the inner diameter of the component-receiving portion can hardly be changed. Therefore, the thickness of the component-receiving portion is set to about 0.2 to 0.25 mm. As described above, the lens-retaining portion has the same thickness as that of the component-receiving portion.

In the process of molding the lens in the lens-retaining portion, a molding pressure is applied not only to the lens but also to the lens barrel. If the lens-retaining portion and the component-receiving portion have the same thickness as in the known structure, the lens-retaining portion cannot bear the molding pressure unless the outer peripheral surface of the lens-retaining portion is retained. Therefore, a mold having a complex structure is used to mold the lens. In addition, since the lens barrel is formed by a cutting process, high costs are incurred.

SUMMARY OF THE INVENTION

A lens barrel assembly according to an aspect of the present invention includes a cylindrical lens barrel obtained by deep drawing a metal sheet and a lens retained by the lens barrel. The lens barrel has a lens-retaining portion that retains the lens at one of two open sides and a component-receiving portion that receives an electric component at the other open side. The lens-retaining portion has an outer diameter that is smaller than an outer diameter of the component-receiving portion and a wall thickness that is larger than a wall thickness of the component-receiving portion.

According to the lens barrel assembly, in the process of molding the lens on the inner peripheral surface of the lens-retaining portion by press forming, the lens barrel can bear the molding pressure. In addition, since the lens barrel can be formed by deep drawing a metal sheet, the lens barrel assembly can be manufactured at a low cost.

BRIEF DESCRIPTION OF THE DRAWING

FIGURE is a longitudinal sectional view of a lens barrel assembly according to an embodiment of the present invention.

DESCRIPTION OF THE PREFERRED EMBODIMENT

An embodiment of the present invention will be described in detail below with reference to the drawing. The FIGURE shows a sectional view of a lens barrel assembly according to the present embodiment. As shown in the figure, the lens barrel assembly according to the present embodiment includes a cylindrical lens barrel 1 and a lens 2 retained by the lens barrel 1. The lens barrel 1 may be formed of ferritic stainless steel, and the lens 2 may be formed of glass. The stainless steel forming the lens barrel 1 has a coefficient of linear expansion that is slightly larger than that of glass. Therefore, when the temperature is changed from a high temperature at which the lens 2 is pressed to a normal temperature, a force is applied to the lens 2 by the lens barrel 1 in a tightening direction and the lens 2 can be reliably retained.

The lens barrel 1 includes a lens-retaining portion 10 for retaining the lens 2 at one of two open sides, a component-receiving portion 11 for receiving an electric component at the other open side, and a step portion 12 that connects the lens-retaining portion 10 to the component-receiving portion 11. The lens-retaining portion 10, the component-receiving portion 11, and the step portion 12 are formed integrally with each other. The lens-retaining portion 10 and the component-receiving portion 11 both have a cylindrical shape, and an inner peripheral surface of the lens-retaining portion 10 is in contact with an outer peripheral surface of the lens 2.

The inner peripheral surface of the lens-retaining portion 10 may be chamfered at the open end thereof so that an inclined surface 14 is formed. Due to the inclined surface 14, after the lens 2 is formed, an antireflection film can be uniformly formed on the lens 2 over the entire area thereof including a peripheral area of the lens 2. A recessed groove 15 may be formed in the inner peripheral surface of the lens-retaining portion 10 in an area where the inner peripheral surface of the lens-retaining portion 10 is in contact with the outer peripheral surface of the lens 2. The recessed groove 15 extends along the entire circumference of the inner peripheral surface of the lens-retaining portion 10. Since the recessed groove 15 is formed in the inner peripheral surface of the lens-retaining portion 10, the air-tightness of the component-receiving portion 11 can be ensured by the lens 2.

The component-receiving portion 11 has a joining flange 13 that projects outward along the outer periphery of the component-receiving portion 11 at the bottom end thereof.

The joining flange 13 is welded and joined to a substrate on which the electric component is disposed in the process of attaching the lens barrel 1 to the substrate.

The lens-retaining portion 10 of the lens barrel 1 has an outer diameter that is smaller than that of the component-receiving portion 11, and has a wall thickness that is larger than that of the component-receiving portion 11. The outer diameter of the component-receiving portion 11 is determined in conjunction with a diameter of a projection used in airtight welding and fixing. The inner diameter of the component-receiving portion 11 is determined in view of flexibility allowance for conductive wires connected to the electric component that is placed in the component-receiving portion 11, and work efficiency in the process of attaching the lens barrel 1. Therefore, the wall thickness of the component-receiving portion 11 is similar to that in the known structure.

The wall thickness of the lens-retaining portion 10 is larger than that of the component-receiving portion 11, and accordingly the lens-retaining portion 10 is stronger than the component-receiving portion 11. Therefore, in the process of molding the lens 2 in the lens-retaining portion 10, the lens-retaining portion 10 can bear the molding pressure applied by a mold and it is not necessary to retain the outer periphery of the lens-retaining portion 10 with a mold. In addition, in the case of welding and joining another component, such as a ferrule, to the lens barrel 1, since the lens-retaining portion 10 has a large wall thickness, the component can be welded to the lens-retaining portion 10 such that the bottom surface of the component is in contact with the top surface of the lens-retaining portion 10.

The step portion 12 has a wall thickness that is between the wall thickness of the lens-retaining portion 10 and the wall thickness of the component-receiving portion 11. The step portion 12 may have a corner portion 16 on an inner peripheral surface thereof at an end adjacent to the lens-retaining portion 10. The corner portion 16 may be rounded so that the radius of curvature of the corner portion 16 is equal to or less than about 0.3 mm. Thus, the effective diameter of the lens 2 retained by the lens-retaining portion 10 can be increased.

The lens barrel 1 is formed by deep drawing a metal sheet. The thickness of the metal sheet before the deep drawing process is about 0.6 mm. In the deep drawing process, the metal sheet is pressed such that the lens-retaining portion 10, the component-receiving portion 11, and the step portion 12 are roughly formed in the final shapes thereof. The lens-retaining portion 10 is formed so as to have a thickness of about 0.4 mm, and the component-receiving portion 11 is formed so as to have a thickness of about 0.2 mm.

The metal sheet, which is the raw material, is formed in a coil shape by hot and cold rolling, and the material characteristics thereof differ between the longitudinal direction and the width direction of the coil shape due to the residual stress that remains after the process of forming the coil shape. Therefore, when the lens barrel 1 is formed by deep drawing, the lens barrel 1 is formed in a shape like a mixture of an elliptical shape and a rectangular shape, and it is difficult to ensure the dimensional accuracy. Therefore, after the deep drawing process, an ironing process (process of squeezing and removing unnecessary portions) is performed in the thickness direction. As a result, the cross-sectional shape of the lens barrel 1 can be made close to an accurately circular shape.

After the external shape of the lens barrel 1 is formed, the recessed groove 15 is formed in the inner surface of the cylindrical lens-retaining portion 10 by repeating a process of forming a groove with a tool at different angles. In the ironing process, process marks that extend in an optical axis direction are formed in the inner surface of the lens-retaining portion 10. However, since the recessed groove 15 is formed so as to extend along the entire circumference, a portion that is free from the process marks can be obtained. Thus, the air-tightness between the outer peripheral surface of the lens 2 and the inner surface of the lens barrel 1 can be increased. In addition, to form the corner portion 16 at the step portion 12, a section corresponding to the corner portion 16 is subjected to plastic processing so that the corner portion 16 having a radius of curvature that is equal to or smaller than about 0.3 mm can be obtained.

Thus, the lens barrel 1 in the lens barrel assembly according to the present embodiment is formed by deep drawing a metal sheet and then performing the ironing process. As a result, the lens barrel 1 having high dimensional accuracy can be formed at a low cost compared to the case in which the lens barrel 1 is formed by a cutting process.

Although the embodiment of the present invention has been described above, the present invention is not limited to the above-described embodiment, and various modifications are possible within the technical scope of the invention.

What is claimed is:

1. A method of manufacturing a lens barrel assembly, comprising:
    forming a lens barrel by deep drawing into a cylindrical shape;
    forming a lens-retaining portion that retains a lens at a first open side of the lens barrel; and
    forming a component-receiving portion that receives an electric component at a second open side of the lens barrel;
    wherein the lens-retaining portion has an outer diameter that is smaller than an outer diameter of the component-receiving portion;
    wherein a wall thickness of the lens-retaining portion is larger than a wall thickness of the component-receiving portion; and
    wherein forming a lens barrel by deep drawing into a cylindrical shape comprises deep drawing ferritic stainless steel by plastic processing.

2. The method of manufacturing a lens barrel assembly according to claim 1 further comprising forming on the lens barrel a step portion between the lens-retaining portion and the component-receiving portion, the step portion having a corner portion on an inner peripheral surface thereof at a position adjacent to the lens-retaining portion, the corner portion being rounded such that a radius of curvature of the corner portion is equal to or less than about 0.3 mm.

3. The method of manufacturing a lens barrel assembly according to claim 1, further comprising forming a groove on an inner peripheral surface of the lens-retaining portion, wherein the groove extends over a circumference of the inner peripheral surface, and wherein the groove is in contact with an outer peripheral surface of the lens.

4. The method of manufacturing a lens barrel assembly according to claim 1, further comprising forming a chamfer on an inner peripheral surface of the lens-retaining portion at the first open side of the lens barrel.

* * * * *